United States Patent
Liu et al.

(10) Patent No.: US 11,250,713 B2
(45) Date of Patent: Feb. 15, 2022

(54) UNMANNED AERIAL VEHICLE OFF-SITE LANDING SYSTEM

(71) Applicant: HONEYWELL INTERNATIONAL INC., Morris Plains, NJ (US)

(72) Inventors: Yang Liu, Shanghai (CN); Alan Bruce Hickman, Cave Creek, AZ (US); Xiaodong Chen, Shanghai (CN); Shuai Chen, Shanghai (CN); Wenwan Feng, Shanghai (CN); Lei Zhang, Shanghai (CN); Yunfei Zou, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 392 days.

(21) Appl. No.: 16/366,253

(22) Filed: Mar. 27, 2019

(65) Prior Publication Data
US 2020/0312168 A1 Oct. 1, 2020

(51) Int. Cl.
*G08G 5/02* (2006.01)
*G05D 1/00* (2006.01)
(Continued)

(52) U.S. Cl.
CPC ........... *G08G 5/025* (2013.01); *B64C 39/024* (2013.01); *B64D 37/26* (2013.01);
(Continued)

(58) Field of Classification Search
CPC .. G08G 5/00; G08G 5/02; G08G 5/39; G08G 5/69; G08G 5/25; G08G 5/21; G08G 5/56;
(Continued)

(56) References Cited

U.S. PATENT DOCUMENTS

| | | | | |
|---|---|---|---|---|
| 7,581,702 B2 * | 9/2009 | Olson | ...................... | H04W 4/40 244/189 |
| 7,702,460 B2 * | 4/2010 | Liu | .......................... | G01S 19/51 701/480 |

(Continued)

FOREIGN PATENT DOCUMENTS

| | | |
|---|---|---|
| EP | 2781980 A1 | 9/2014 |
| KR | 101621781 B1 | 5/2016 |

(Continued)

OTHER PUBLICATIONS

An abstract of "Unmanned aerial vehicle emergency landing site identification system using machine vision"; S Aziz, RM Faheem, M Bashir . . . —Journal of Image and Graphics—from https://www.semanticscholar.org/ (Year: 2016).*

(Continued)

*Primary Examiner* — Cuong H Nguyen
(74) *Attorney, Agent, or Firm* — Lorenz & Kopf, LLP

(57) ABSTRACT

A fixed wing unmanned aircraft and a method for operating the same are provided. The fixed wing unmanned aircraft may include, but is not limited to, a failure detection system configured to detect faults in one or more of the plurality of components, a capability evaluation system communicatively coupled to the failure detection system, the capability evaluation system configured to determine a capability level of the fixed wing unmanned aerial vehicle based upon the faults in the one or more of the plurality of components, and a trajectory generation system communicatively coupled to the failure detection system and the capability evaluation system, the trajectory generation system configured to generate a touch down trajectory for the fixed wing unmanned aerial vehicle based upon the determined capability level of the fixed wing unmanned aerial vehicle, wherein when the determined capability level is below a predetermined thresh- (Continued)

old, the touch down trajectory comprising a stall maneuver configured to minimize a lateral energy of the fixed wing unmanned aerial vehicle.

20 Claims, 5 Drawing Sheets

(51) Int. Cl.
    *B64C 39/02*     (2006.01)
    *B64D 37/26*     (2006.01)
    *G05B 23/02*     (2006.01)
    *G08G 5/00*     (2006.01)

(52) U.S. Cl.
    CPC ....... *G05B 23/0218* (2013.01); *G08G 5/0056* (2013.01); *B64C 2201/104* (2013.01); *B64C 2201/12* (2013.01)

(58) Field of Classification Search
    CPC .......................... B64D 37/26; B64C 2201/104; G05D 1/0676; G05B 23/0218
    USPC ............................................................ 701/3
    See application file for complete search history.

(56) References Cited

U.S. PATENT DOCUMENTS

| | | | | |
|---|---|---|---|---|
| 8,543,265 | B2* | 9/2013 | Ekhaguere | G08G 5/0021 701/11 |
| 8,626,364 | B2* | 1/2014 | Moresve | G05D 1/0684 701/15 |
| 8,655,619 | B1* | 2/2014 | Mannas | G01P 15/00 702/141 |
| 8,775,013 | B1* | 7/2014 | Smailus | B64F 5/60 701/31.4 |
| 8,996,207 | B2* | 3/2015 | Goossen | G08G 5/02 701/18 |
| 9,016,617 | B2* | 4/2015 | Wang | B64D 43/00 244/17.17 |
| 9,257,048 | B1 | 2/2016 | Offer et al. | |
| 9,274,529 | B2 | 3/2016 | Ben-Shachar et al. | |
| 9,359,067 | B2 | 6/2016 | Fucke et al. | |
| 9,747,809 | B2* | 8/2017 | Levien | G08G 5/04 |
| 9,851,724 | B2* | 12/2017 | Bianchi | B64D 47/08 |
| 10,049,590 | B2* | 8/2018 | Thiele | B64C 39/02 |
| 10,124,907 | B1* | 11/2018 | Gavrilets | B64C 27/006 |
| 2006/0167599 | A1 | 7/2006 | Bodin et al. | |
| 2007/0164167 | A1* | 7/2007 | Bachelder | G05D 1/105 244/220 |
| 2014/0303884 | A1* | 10/2014 | Levien | G05D 1/0088 701/301 |
| 2016/0139603 | A1* | 5/2016 | Bianchi | G01S 19/48 701/4 |
| 2016/0231137 | A1 | 8/2016 | Krogh et al. | |
| 2016/0232795 | A1* | 8/2016 | Thiele | G05D 1/0022 |
| 2016/0240091 | A1* | 8/2016 | Thiele | G08G 5/0065 |
| 2016/0318601 | A1* | 11/2016 | Arnold | B64C 9/12 |
| 2017/0069214 | A1* | 3/2017 | Dupray | G08G 5/0013 |
| 2018/0025650 | A1* | 1/2018 | Taveira | B64C 39/024 701/3 |
| 2018/0114450 | A1 | 4/2018 | Glaab et al. | |
| 2018/0129226 | A1* | 5/2018 | Rogers | G05D 1/105 |
| 2018/0227959 | A1* | 8/2018 | Fraccaroli | H04W 76/14 |
| 2019/0009904 | A1* | 1/2019 | Winkle | G08G 5/0056 |
| 2019/0014461 | A1* | 1/2019 | Winkle | G08G 5/0056 |
| 2019/0250640 | A1* | 8/2019 | O'Flaherty | G06N 20/00 |

FOREIGN PATENT DOCUMENTS

| | | |
|---|---|---|
| WO | 2006059324 A1 | 6/2006 |
| WO | 2017126894 A1 | 7/2017 |

OTHER PUBLICATIONS

Toward Autonomous Aircraft Emergency Landing Planning; Almeida di donato, Pedro Fernando, Thesis from http://hdl.handle.net/2027.42/140916 (year: 2017).*
Automated Emergency Landing System for Drones: SafeEYE Project; O Bektash, JN Pedersen, AR Gomez et al; 2020 International Conference on Unmanned Aircraft Systems (ICUAS), Athens, Greece. Sep. 1-4, 2020—ieeexplore.ieee.org (year: 2020).*
Model-based fail-safe module for autonomous multirotor UAVs with parachute systems; A Hasan, V Tofterup, K Jensen—2019 International Conference on Unmanned Aircraft Systems (ICUAS); Atlanta, GA, USA, Jun. 11-14, 2019—ieeexplore.ieee.org (year: 2019).*
Autonomous uav navigation for active perception of targets in uncertain and cluttered environments; J Sandino, F Vanegas, F Gonzalez, F. Maire—2020 IEEE Aerospace Conf—ieeexplore.ieee.org; (year: 2020).*
On-board deep-learning-based unmanned aerial vehicle fault cause detection and identification; V Sadhu, S Zonouz, D Pompili—2020 IEEE International Conf, 2020—ieeexplore.ieee.org (year: 2020).*
Parkin, S.; Intelligent Machines, Teaching Drones How to Crash Safely; Jul. 21, 2017.

* cited by examiner

UNMANNED AERIAL VEHICLE OFF-SITE LANDING SYSTEM

TECHNICAL FIELD

The present disclosure generally relates to an aircraft, and more particularly relates to unmanned aerial vehicles and the landing thereof.

BACKGROUND

Unmanned aerial vehicles have an expanding role in the transportation of cargo, surveillance and a variety of other uses. Due to the nature of the unmanned aerial vehicles, namely that there are no passengers aboard the vehicle, unmanned aerial vehicles typically have lower safety standards when compared to manned aircraft. While lower safety standards may be acceptable for the unmanned aerial vehicles itself, the potential for damage to people and property on the ground still exists when the unmanned aerial vehicle experiences a failure.

BRIEF SUMMARY

In one embodiment, for example, a fixed wing unmanned aerial vehicle is provided. The fixed wing unmanned aerial vehicle may include, but is not limited to, a failure detection system configured to detect faults in one or more of the plurality of components, a capability evaluation system communicatively coupled to the failure detection system, the capability evaluation system configured to determine a capability level of the fixed wing unmanned aerial vehicle based upon the faults in the one or more of the plurality of components, a trajectory generation system communicatively coupled to the failure detection system and the capability evaluation system, the trajectory generation system configured to generate a touch down trajectory for the fixed wing unmanned aerial vehicle based upon the determined capability level of the fixed wing unmanned aerial vehicle, wherein when the determined capability level is below a predetermined threshold, the touch down trajectory comprising a stall maneuver configured to minimize a lateral energy of the fixed wing unmanned aerial vehicle.

In another embodiment, for example, a method of operating a fixed wing unmanned aerial vehicle having a plurality of components is provided. The method may include, but is not limited to, detecting, by a failure detection system, one or more faults in the plurality of components, determining, by a capability evaluation system, a capability level of the fixed wing unmanned aerial vehicle based upon the detected one or more faults, and generating, by a trajectory generation system, a touch down trajectory for the fixed wing unmanned aerial vehicle, wherein when the determined capability level is below a predetermined threshold, the touch down trajectory includes a stall maneuver configured to minimize a lateral energy of the fixed wing unmanned aerial vehicle.

In yet another embodiment, for example, fixed wing unmanned aerial vehicle having a plurality of components is provided. The fixed wing unmanned aerial vehicle may include, but is not limited to, a failure detection system configured to detect faults in one or more of the plurality of components, wherein the failure detection system continuously monitors the fixed wing unmanned aerial vehicle for new faults and when faults are resolved, a communication system, the communication system comprising at least one data communication system and at least one voice communication system, and a processor communicatively coupled to the control system and the failure detection system, the processor configured to determine, when one or more faults are detected by the failure detection system, a capability level of the fixed wing unmanned aerial vehicle based upon the one or more detected faults, wherein the processor is further configured to continuously update the capability level based upon any new faults received from the failure detection system and any resolved faults received from the failure detection system, determine, when the capability level of the unmanned aerial vehicle is below a predetermined threshold, that an off-site landing is necessary, wherein the processor is further configured to continuously update determination that an off-site landing is necessary based upon updates to the determined capability level and cancel a determination that an off-site landing is necessary when the capability level rises above the predetermined threshold, generate, when an off-site landing is necessary, a voice warning using the voice communication system, the voice warning comprising at least one of a pre-recorded message and a voice synthesized message, determine, when an off-site landing is necessary, a maximum range of the fixed wing unmanned aerial vehicle based upon the capability level of the unmanned aerial vehicle, determine, based upon the capability level and the maximum range of the fixed wing unmanned aerial vehicle, whether a predetermined off-site landing site is within the maximum range of the unmanned aerial vehicle, the predetermined off-site landing site comprising a designated area for off-site landings, determine a path to the predetermined off-site landing based upon the determine capability level of the fixed wing unmanned aerial vehicle, a type of landing site associated with the predetermined off-site landing site and the type of faults detected, wherein the path is determined according to determining, by the processor, when a trajectory can be built based upon the capabilities of the fixed wing unmanned aerial vehicle that will allow the fixed wing unmanned aerial vehicle to come to a full stop inside of a defined area within the predetermined off-site landing site, where the path is set to include the trajectory, and determining, when the trajectory cannot be built to allow the fixed wing unmanned aerial vehicle to come to a full stop inside of a defined area within the predetermined off-site landing site, a trajectory which minimizes a lateral energy of the fixed wing unmanned aerial vehicle within the predetermined off-site landing site, the trajectory including a pitch as the fixed wing unmanned aerial vehicle approaches the ground which induces a stall of the fixed wing unmanned aerial vehicle, generate commands for the control system to direct the unmanned aerial vehicle to the predetermined off-site landing site using the determined path when the predetermined off-site landing site is within the determined maximum range of the unmanned aerial vehicle and generate commands for the control system to direct the unmanned aerial vehicle away from populated areas when the predetermined off-site landing site is outside the determined maximum range of the unmanned aerial vehicle.

BRIEF DESCRIPTION OF THE DRAWINGS

The detailed description will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

An unmanned aerial vehicle and an off-site landing system therefore is discussed herein. The off-site landing system detects faults in components of the unmanned aerial vehicle and determines, based upon those faults, how to land the unmanned aerial vehicle. The landing may include, for example, a maneuver which minimizes the lateral energy of the unmanned aerial vehicle, as discussed in further detail below.

Figure 1:
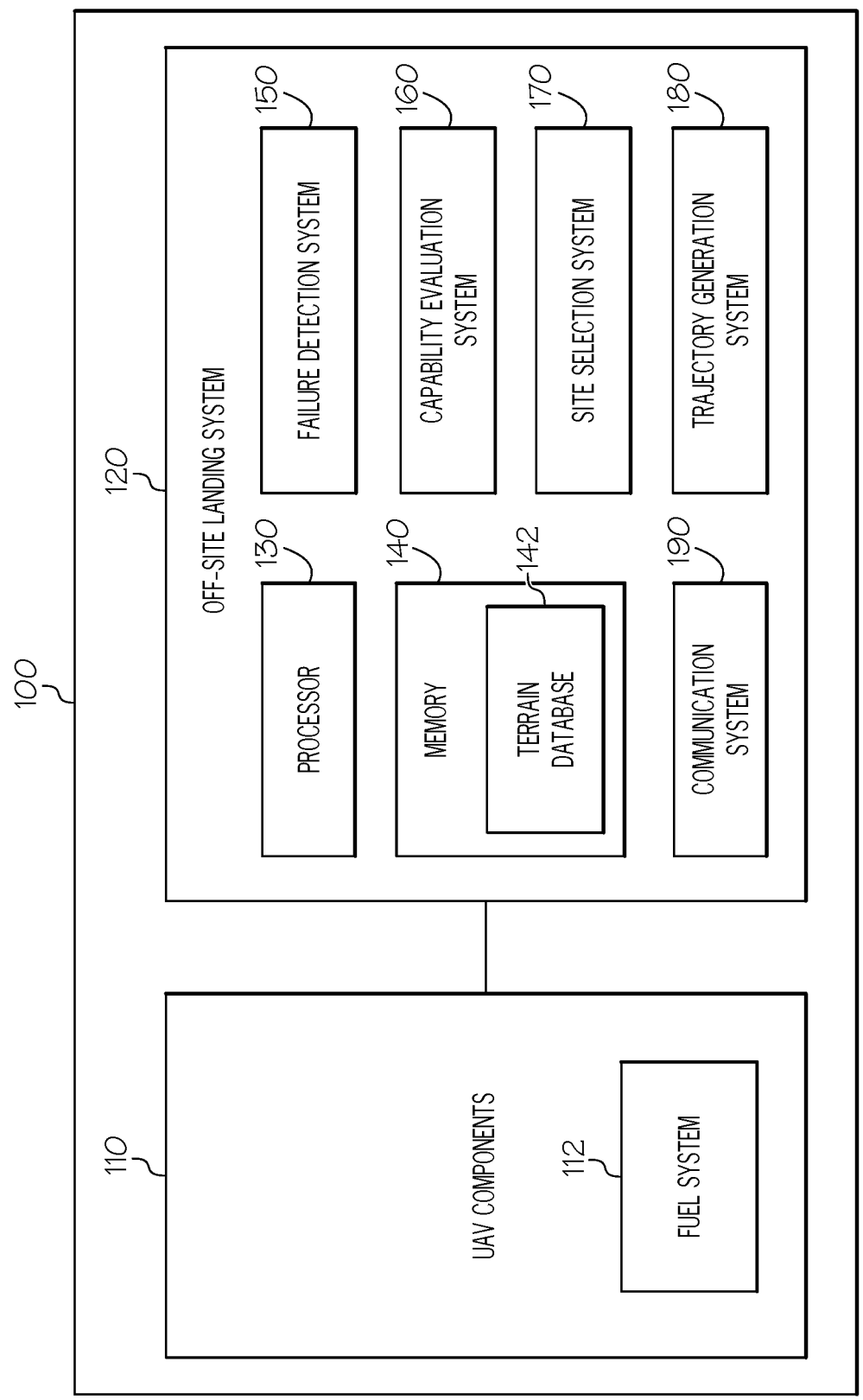
FIG. 1 is a block diagram of an unmanned aerial vehicle, in accordance with an embodiment.

FIG. 1 is a block diagram of an unmanned aerial vehicle (UAV) 100, in accordance with an embodiment. The UAV 100 discussed herein is a fixed wing UAV, which may also be referred to as a fixed wing drone. However, certain features of the UAV 100 may be applied to rotary based UAVs or manned aircraft in general. The UAV 100 includes numerous components 110 including any combination of engine systems, air data systems, inertial references systems, global positioning systems, electrical power systems, fire detection systems, communication systems, landing systems, and the like. The components 110 of the UAV 100 may vary depending upon the size and purpose of the UAV (e.g., payload delivery, surveillance, etc.). In one embodiment, for example, the components 110 may include a fuel system 112. As discussed in further detail below, the fuel system may be instructed to dump any fuel therein to reduce the risk of fire during an emergency landing.

When one or more of the components 110 of the UAV experiences a failure, an off-site landing may be necessary depending upon which component is experiencing a failure and to what level. An off-site landing is a landing at a location other than a runway. Accordingly, the UAV 100 further includes an off-site landing system 120. As discussed in further detail below, the off-site landing system 120 continuously monitors the component 110 of the UAV 100 for failures, evaluates the capabilities of the UAV 100, and, if necessary, determines a location for an off-site landing and a trajectory of the off-site landing.

The off-site landing system 120 includes one or more processors 130. The processor(s) may be, for example, central processing units (CPUs), graphical processing units (GPUs), physics processing units (PPUs), application specific integrated circuits (ASICs), field programmable gate arrays (FPGAs), microprocessors, or any other logic unit, and any combination thereof. The processor(s) 130 may be dedicated to the off-site landing system 120 or may be shared by one or more of the components 110 of the UAV 100. As discussed in further detail below, the off-site landing system 120 includes various systems. The systems may include their own processor(s) 130 or may share processor(s) with one or more other systems within the off-site landing system 120 or within the UAV 100.

The off-site landing system 120 further includes a memory 140. The memory 140 may be any combination of non-volatile and volatile memory units. A part of the memory 140 may be a cloud-based memory located remotely from the UAV 100. The memory 140 may store a terrain database 142 which may be used by the off-site landing system 120 to determine an off-site landing location, as discussed in further detail below. The memory 140 may further include non-transitory instructions for implementing the off-site landing system 120, as discussed in further detail below.

The off-site landing system 120 includes a failure detection system 150. The failure detection system 150 continuously monitors the status of the components 110 of the UAV 100. The failure detection system 150 may include components which are dedicated to the failure detection system 150 and/or components which may be shared by one or more other components 110 in the UAV 100. For example, the failure detection system 150 may include a fire detection system, flap position sensors, engine system, electrical power system, flight control system, navigation system, communication system, and the other components to monitor the status for other onboard systems and the environmental status, or the like, or any combination thereof. In one embodiment, for example, the components 110 of the UAV 100 may form part of the failure detection system 150 by self-reporting any failures to the off-site landing system 120.

The off-site landing system 120 further includes a capability evaluation system 160. The capability evaluation system 160 determines a capability level of the UAV based upon any one or more failures determined by the failure detection system 150. The capability evaluation system 160 may include one or more processors 130 and memory 140 which are dedicated to the capability evaluation system 160 or shared with one or more other systems on the UAV 100.

The capability level of the UAV 100 may define how the off-site landing system 120 responds to the detected failure. Some failures may be minor enough that the off-site landing system 120 has the UAV 100 continue normal operation to the destination. Other failures may require immediate off-site landings. Table 1 below lists exemplary components 110 with exemplary failures and the respective capability level.

TABLE 1

| Component | Failure Mode | Effect on UAV | Failure Effect on Landing | Capability Level |
|---|---|---|---|---|
| Engine | Loss of engine | Unable to maintain speed, glide only, Emergency control only with backup power | Unable to maintain the speed, able to flare with backup power | Nearest landing site |
| Electrical Power System | Total loss of electrical power | Emergency control only with backup power | Degraded landing performance with limited controllability | Nearest landing site |
| Braking control system | Total loss of braking function | No effect for flight, degraded deceleration capability on ground | Longer landing distance | Nearest landing site |
| Emergency Locator Transmitter | Total loss of function | None, assuming data link still valid | None | Destination |
| Flight Control | Loss of controllability to maintain safe landing (e.g. Loss of control on single axis) | Unable to maintain safe flight path, compensation control needed | Unable to perform landing | Nearest off-site landing site |

The failures listed in Table 1 are non-exhausted and may vary between various UAVs 100 depending upon what components 110 are present on the UAV 100. Furthermore, the capability levels of the UAV 100 in response to certain failures can vary. In other words, different UAVs may respond to the same failure in different ways. For example, a UAV 100 may be equipped with an inertial tracking system which may allow the UAV 100 to continues to the destination in the event a global positioning system (GPS) experiences a failure, for at least a period of time, whereas a UAV 100 which does not have an inertial tracking system may have to perform an off-site landing in the event it experiences a GPS failure.

In this exemplary embodiment, the capability levels are destination, nearest landing site and nearest off-site landing site. A capability level of destination would indicate that the UAV 100 has enough capability remaining to continue to the original destination as planned.

A capability level of nearest landing site indicates that the UAV 100 has enough capability remaining to attempt a normal landing at a nearest landing site. In this context, the nearest landing site is a runway or a dedicated field for landing which includes a flat enough surface of a predetermined length at which the UAV 100 can attempt a landing. The landing site may be a runway at an alternate airport (i.e., not the destination airport). The predetermined length may vary depending upon the capabilities of the UAV 100. For example, as seen in Table 1 above, when the braking control system is experiencing a failure, a longer landing site may be necessary. In order to be considered to be capable of landing, the UAV 100 should have directional, lateral and longitudinal control, enough data for automatic path control and landing is available. The data may include, for example, positioning, altitude, heading, airspeed, flight path angle, and the like.

A capability level of nearest off-site landing site indicates that the UAV 100 does not have the capability to perform a normal landing procedure, which triggers an off-site landing, as discussed in further detail below. An off-site landing site may be any site which will minimize collateral damage due to people or property on the ground.

In addition to determining a capability level of the UAV 100, the capability evaluation system 160 may determine the general capabilities of the UAV 100. Depending upon what component 110 of the UAV 100 is experiencing a failure and to what degree, the general capabilities of the UAV 100 can vary. The general capabilities of the UAV 100 determined by the capability evaluation system 160 may help determine which landing site or off-site landing site is selected as well as a trajectory (i.e., flight path) for the landing.

The off-site landing system 120 further includes a site selection system 170. The site selection system 170 may include one or more processors 130 and memory 140 which is dedicated to the site selection system 170 or shared with one or more other systems on the UAV 100. In one embodiment, for example, the memory 140 may store a terrain database 142 which indicates the location of potential landing sites and off-site landing sites. In one embodiment, for example, the terrain database 142 may store all potential landing sites and off-site landing sites along a known route of the UAV 100. This method may be used when the UAV 100 travels along a familiar route (e.g., cargo delivery between two locations). In another embodiment, the terrain database 142 may store terrain data, such as elevation data, obstacle data, population area, sensitive area (e.g., an oil processing plant), no population area (e.g., desert, river, ocean), and the like. In this embodiment, the site selection system 170 may evaluate the terrain database to determine a landing site or off-site landing site based upon the capabilities of the UAV 100 and the terrain around the UAV 100 at the time of the failure. Any combination of the site selection methods may be used depending upon the typical use case of the UAV 100.

The capability evaluation system 160 may also determine a maximum range of the UAV 100 based upon the detected faults. The maximum range could be computed based on the factors including fault type, engine status, fuel left on board, fuel flow, battery status, UAV altitude and speed, wind, and the like. Margins may be added to the maximum range to account for the inaccuracy and uncertainty factors. For example, for the failure of total loss of engine, the maximum range could be the max power off glide distance with margins; for an electrical power system failure, the max distance is determined by the left battery power; for a fuel leak failure, the max distance could be computed by estimating the time left before all the fuel will be drained, then multiply the time by the speed, and then sums with the aircraft glide performance. When multiple sites are within the maximum range of the UAV 100, the site selection system 170 may select a landing site or off-site landing site which is closest to the current location (or last known location) of the UAV 100. However, the closest landing site or off-site landing site may not be the optimum choice. The site selection system 170 may receive general capability data from the capability evaluation system 160 to determine a landing site or an off-site landing site which matches the capabilities of the UAV 100. For example, different landing sites may have different lengths, different approach angles due to terrain or obstacles, or the like. Accordingly, the site selection system 170 may select the closest landing site which has a length corresponding to the capable stopping distance of the UAV 100 given the capabilities of the UAV 100 received from the capability evaluation system 160. For example, the capability evaluation system 160 determines that the UAV 100 can still perform landing maneuver, but only off-site landing sites are in range, considering in this scenario there will not be many off-site landing sites can be selected, the site selection system 170 may prioritize the off-site landing sites by size, surface type and the like, and select the closest off-site landing site at which a landing maneuver can be performed. In one embodiment, for example, the site selection system 170 may continuously determine a closest landing site or off-site landing site and the trajectory to the site even when the UAV 100 is not experiencing an error. Accordingly, in the event a failure of a component occurs, the off-site landing system 120 can immediately direct the UAV 100 towards the preselected landing site or off-site landing site with minimal delay.

The capabilities of the UAV 100 may also affect whether a trajectory can be built to a selected site. Accordingly, the off-site landing system 120 further includes a trajectory generation system 180. As discussed in further detail below, the trajectory generation system 180 etermines if a trajectory can be built to a selected site which is within the capabilities of the UAV 100 based upon data from the capability evaluation system 160. When a trajectory cannot be built to a selected landing site, the trajectory generation system 180 requests a new landing site from the site selection system 170. If no landing site is within the capabilities of the UAV 100, either based upon the maximum range of the UAV 100 or no trajectory can be built to a landing site that is within the capabilities of the UAV 100, the trajectory generation system 180 generates a trajectory towards an off-site landing site which minimizes potential collateral damage, as discussed in further detail below. If the UAV 100 is not capable of performing an off-site landing, based upon the capabilities of the UAV 100, the trajectory generation system 180 generates a flight path directing the UAV 100 towards a least populated area within the maximum range of the UAV 100.

The off-site landing system further includes a communications system 190. The communications system 190 may utilize any wireless communications protocol. The communications system 190 includes at least one system capable of transmitting audible voice messages. As the UAV 100 is by definition an unmanned vehicle, the audible voice messages may include prerecorded audible voice messages, text-to-speech processed voice messages (i.e., voice synthesized), or a combination thereof. In the event the UAV 100 experiences a failure, the processor 130 may cause the communications system 190 to output an audible voice message on a channel typically monitored by other aircraft. This audible message allows other pilots of other aircraft in the area to be informed of, for example, the failure the UAV 100 is experiencing and a projected trajectory of the UAV 100 as determined by the trajectory generation system 180 so that pilots can evaluate whether or not they need to take action with their own aircraft.

Figure 2:
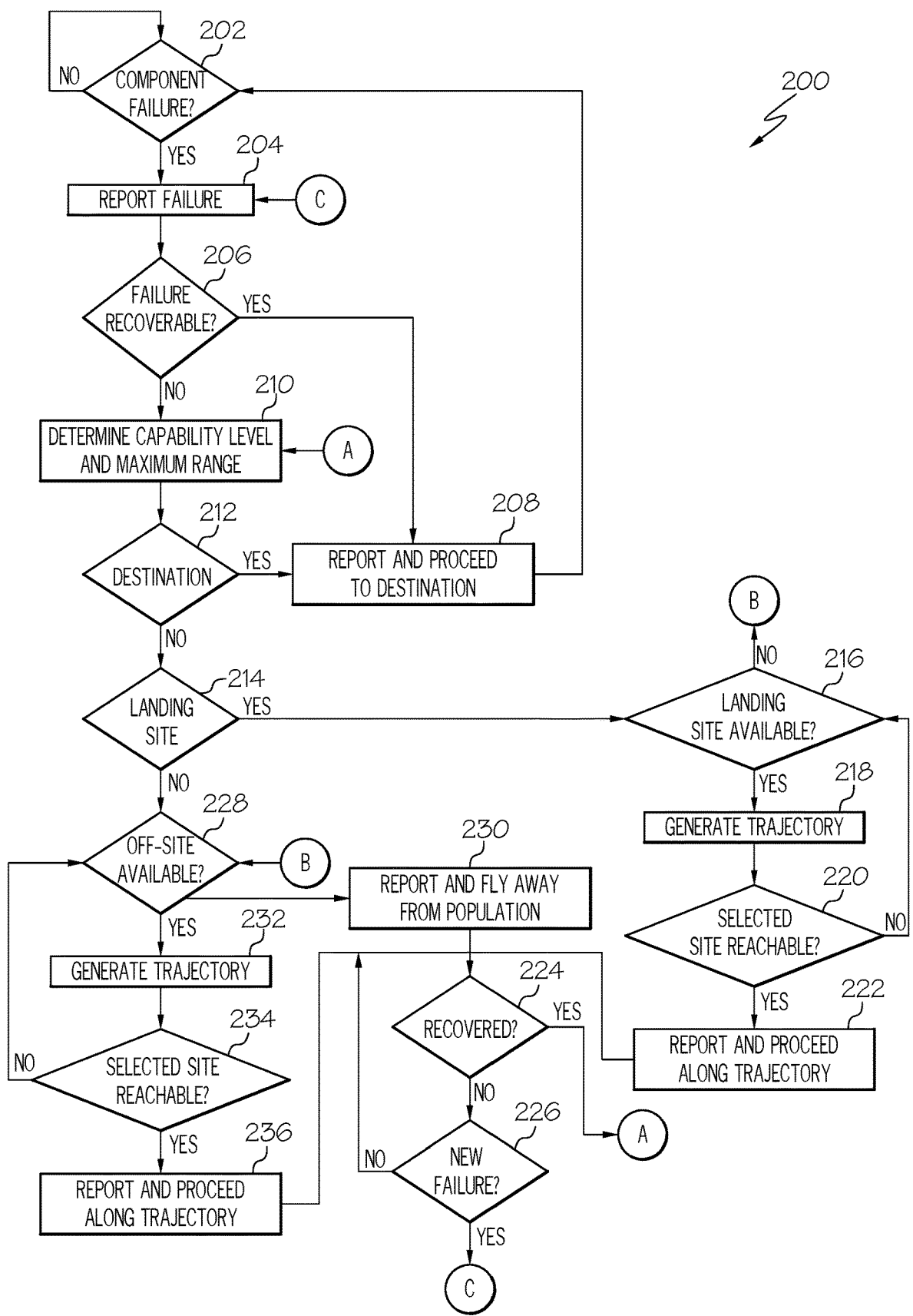
FIG. 2 is a flow chart illustrating an exemplary method for operating the off-site landing system, in accordance with an embodiment.

FIG. 2 is a flow chart illustrating an exemplary method 200 for operating the off-site landing system, in accordance with an embodiment. Upon departure, the failure detection system 150 begins monitoring the components 110 of the UAV 100 for any failures. (Step 202). The failure detection system 150 may actively monitor for failures, passively monitor for failures, or a combination thereof. The failure detection system 150 may actively monitor for failures using various sensors or other detection equipment configured to monitor on or more components 110 of the UAV 100. The failure detection system 150 may passively monitor for failures by receiving self-reported failures. In other words, one or more components 110 of the UAV 100 may be configured to self-report a failure to the failure detection system 150. When no failure is detected, the failure detection system 150 continues monitoring for failures and the UAV 100 continues along its current mission.

When a failure is detected by the failure detection system 150, a report is generated by the processor 130 and transmitted via the communication system 190. (Step 204). The report may include a data-based report, an audible voice report, or a combination thereof. The data report may be transmitted to the operator of the UAV 100 and air traffic control. The data report may include, for example, a flight identifier associated with the UAV 100 as well as any data available regarding the failure. The voice report may include one or more of a prerecorded voice message and a text-to-speech voice message providing any available data on the failure through a voice channel typically monitored by aircraft. As discussed above, by providing a voice message, the UAV 100 can inform other pilots who may be in the area of the failure, allowing the other pilots to operate their aircraft as necessary to avoid the UAV 100.

The processor 130 and/or the components 110 themselves, may then attempt to recover from the failure. (Step 206). Certain components 110 may have a recovery procedure which may be initiated upon detection of the failure. The recovery procedure may vary depending upon the component 110 and the type of failure which has occurred. For example, an engine restart procedure may be initiated to recover the engine failure; fire suppression system may be initiated for the detected fire; resetting of power switches may be initiated for an electrical power system fault. When the failure is fully recoverable, the processor 130 generates a report and the UAV can continue to the original destination as planned. (Step 208). The report may be data based, voice based, or a combination thereof, and contain information relative to the failure recovery.

When the failure is only partially recoverable or not recoverable, the capability evaluation system 160 determines the capability level and the maximum range of the UAV 100. (Step 210). The capability level of the UAV 100 is based upon the component 110 which has failed, the degree to which the component has failed (e.g., fully or partially) as well as the existence of any other components 110 which can act as a backup for the failed component 110. In one embodiment, for example, a lookup table may be stored in the memory 140 which correlates each potential failure with a capability level. In one embodiment, for example, the capability levels may be destination, landing site, off-site landing and fly away. However, the number of capability levels and their respective definitions may vary. In one embodiment, for example, a destination capability level may require a minimum set of control surfaces to meet the required directional, lateral and longitudinal maneuver capability for safe landing. However, certain failures may include cascading failures which reduce the capability level of the UAV 100. In other words, certain failures to a component 110 may cause other components to have less than full functionality. For example, a complete loss to a GPS system does not directly affect the operability of an engine or a flap, however, the complete loss to a GPS system may cause the UAV 100 to lose the ability to navigate, and, thus land at the original destination. Table 1 above listed numerous failures with respective capability levels. However, as discussed above, the failures of the components 110 of the UAV 100 and the respective capability level associated therewith may vary between UAVs 100 depending upon the components 110 with the respective UAVs 100.

The lookup table may further correlate the remaining capabilities of the UAV 100 with the respective failures as capability data. The capability data may define, for example, what maneuvers and operations the UAV 100 is capable of performing, which components 110 are operable, and the degree that the components 110 are operable. For example, a failure to one component 110 may fully or partially disable another component 110 which may not be experiencing a failure. As discussed in further detail below, the capability data may be used when generating a trajectory for the UAV 100.

The capability evaluation system 160 determines the maximum range of the UAV 100 based upon the detected faults and/or capability data. In one embodiment, for example, the lookup table may correlate the detected faults with the capability data and with a method for calculating a maximum range given the faults and the current altitude of the UAV 100 and any other relevant factors. For example, when the failure is a loss of all engines, the maximum range may be based upon a maximum power off glide distance of the UAV 100; for an electrical power system failure, the max distance is determined by the left battery power; for a fuel leak failure, the max distance could be computed by estimating the time left before all the fuel will be drained. The determined range may then be multiplied by a speed factor of the UAV and then summed with the UAV 100 glide performance.

In one embodiment, for example, the capability evaluation system 160 may not wait for a recovery procedure to complete before beginning to evaluate the capability level of the UAV 100. As discussed in further detail below, the off-site landing system continuously monitors for a recovery and updates the flight plan for the UAV 100 as the UAV 100 either recovers from failures or experiences more failures.

When the capability evaluation system 160 determines that the capability level is the original destination (Step 212), the processor 130 generates a report with any updated information and continues to the destination as planned. (Step 208). The report may include a data report, a voice report, or any combination thereof and may include one or more of any information on the failures, the trajectory of the UAV 100, or the like. The process then proceeds back to Step 202 and the fault detection system 150 continues to monitor for any new faults.

When the capability evaluation system 160 determines that the capability level is a landing site (Step 214), the site selection system 170 determines if a landing site is available and selects a landing site for evaluation. (Step 216). A landing site may be selected for evaluation if the landing site is within the maximum range of the UAV 100 and within certain capabilities of the UAV 100. For example, the site selection system 170 may consider the length of the landing site, the landing capabilities, the weather conditions, the traffic information, the ground equipment, or the like. For example, if the closest landing site within range of the UAV 100 is a runway at an airport, but the UAV 100 is incapable of a normal landing, the site selection system 170 may not select the airport so as to avoid hampering the operation of the airport.

When there is an available landing site for evaluation, the trajectory generation system 180 attempts to build a trajectory to the selected landing site based upon the capabilities of the UAV 100 and the failure(s) detected. (Step 218). In one embodiment, for example, the trajectory generation system 180 includes a flight management system (FMS), or otherwise cooperate with a FMS to build the trajectory. The trajectory includes the flight path to the landing site and a landing path to touchdown. The trajectory generation system 180 adds additional variables to the trajectory based upon the failure and the capabilities of the UAV 100. For example, if the UAV 100 is on fire, but its capabilities are otherwise not currently affected, the trajectory generation system 180 may generate a trajectory with a steep decent path at a higher than normal speed to suppress the fire and land as soon as possible. As another example, the trajectory generation system 180 generate a trajectory form current position to intercept a predefined approach and landing path to a landing site, the predefined path could be terrain and traffic free.

When the trajectory generation system 180 is unable to build a trajectory to a selected site or the built trajectory is longer than the maximum range that UAV 100 can reach, the process returns to Step 216 and the site selection system 170 determines if another landing site is available. (Step 220). A trajectory for a selected site that is within the maximum range might not be able to be built, for example, when terrain clearance is not feasible, or the generated path is longer than the maximum range due to turns or terrain avoidance.

When the trajectory generation system 180 is able to build a trajectory to a selected site (Step 220), the processor 130 generates and sends an updated report via the communication system 190 and proceeds to the selected landing site along the trajectory. (Step 222). As discussed above, the report may include a voice generated report to inform pilots of other aircraft in the area about the UAV 100 and the trajectory.

The processor then continues to monitor for a successful completion of a recovery procedure. (Step 224). As discussed above, the off-site landing system 120 may not wait for a recovery procedure to complete before beginning the process to alter the course of the UAV 100. Some recovery procedures may take a long time to complete. Others recovery procedures may not be successful the first time they are attempted. Accordingly, by continuously monitoring for a recovery, the off-site landing system 120 gives the UAV 100 the best possible chance of recovering and performing a normal landing when failures are detected. If a recovery procedure is determined to be successful, the process returns to Step 210 to re-determine the capabilities of the UAV 100. Depending upon the failure, the extent of the recovery and the newly determined capabilities of the UAV 100, the capability level of the UAV 100 may be upgraded, either returning the UAV 100 to the destination capability level, or upgrading an off-site landing or lower status to a landing site capability level, reducing the likelihood of damage to the UAV 100 and any collateral damage to other property.

When the recovery procedure has not been successful, the failure detection system 150 continues to monitor for any new failures. (Step 226). Certain failures may lead to new failure occurring. For example, an ongoing fire onboard the UAV 100 may disable a component 110 which was previously fully operating. When a new failure is detected, the process returns to Step 204 where the new failure is reported, followed by the recovery procedure initiation as well as the new capability level determinations of Steps 206 and 210. When no new failures have occurred, the process returns to Step 224 where the processor 224 continues to actively initiate recovery procedures and monitors for the success thereof.

When no landing site is available (from Step 216) or upon a determination that the capability level is off-site landing or lower, the site selection system 170 determines if an off-site landing location is available. (Step 228). The site selection system 170 may determine that an off-site landing location is available when an off-site landing location that is within the maximum range of the UAV 100 and is within the capabilities of the UAV 100.

When there is no off-site landing site within the maximum range, when there is an off-site landing site within the maximum range but not within the capabilities of the UAV 100, or when the UAV 100 is not capable of performing an off-site landing based upon the capability level, the processor 130 of the off-site landing system 120 generates commands to cause the UAV 100 to fly away from population or sensitive area and, if possible, generate a report. (Step 230). The capability level of the UAV 100 may be less than an off-site landing capability when the UAV 100 cannot perform the maneuvers for an off-site landing. For example, if the UAV 100 lost all flight controls, the off-site landing system 120 could generate variable thrust command to maneuver away from the population or sensitive area; if the UAV 100 is fully jammed on a pitch axis, the off-site landing system 120 could generate aggressive directional commands to avoid population area before the UAV 100 experiences a complete loss of control; the UAV 100 lost its position and UAV 100 could hold its heading and wait for a defined period to see if the position can be restored, if not, the off-site landing system 120 could generate commands to maintain a heading or track to fly toward a wide no population area like a desert or ocean. As discussed above, the report may be a data report, a voice report, or a combination thereof. The memory 140 may store locations along the route of the UAV 100 with little to no population that the UAV 100 can aim for. The process then proceeds to Step 224 to determine if the UAV 100 can recover from the failure.

When an off-site landing site is available, the trajectory generation system 180 attempts to build a trajectory to the off-site landing site. (Step 232). The trajectory generated by the trajectory generation system 180 is based upon the capabilities of the UAV 100 and data corresponding to the off-site landing site. The data of the off-site landing site includes the terrain of the off-site landing site, the terrain surrounding the off-site landing site, the size of the off-site landing site and the type of the off-site landing site. The terrain of the site itself and the surrounding area may include both manmade objects (e.g., buildings, power lines, etc.) as well as natural objects (e.g., mountains, hills, trees etc.). The terrain data is used to generate a trajectory which attempts to avoid obstacles, both man made and natural which may block the UAV 100 from landing within the off-site landing site.

The size of the off-site landing site includes the dimensions of the off-site landing site. The trajectory generation system 180 may utilize the dimensions of the off-site landing site to determine a length of the off-site landing site in a direction of the approach. The length is used to ensure that the UAV 100 can land and stop within the off-site landing site to minimize any collateral damage to areas outside of the off-site landing site.

The trajectory generated by the trajectory generation system 180 may vary depending upon the terrain data, the size of the off-site landing site and the type of the off-site landing site as well as the capabilities of the UAV. For example, when the UAV 100 is experiencing degraded control, such as lost pitch control, the trajectory generation system 180 may generate a trajectory which uses the engine to trim the speed and stay on a generated flight path. As another example, if the UAV 100 has lost all altitude and/or height data, the trajectory generation system 180 may generate a trajectory which is level until within the area of the off-site landing site, then perform a cycle decent until touchdown. Another example is that if the off-site landing site is a river, the trajectory generation system 180 may generate a ditching trajectory with gear up.

In many cases, the ideal trajectory may include a maneuver which minimizes the lateral energy of the UAV 100. In a typical landing scenario, an aircraft lands with minimal vertical energy such that the touchdown is relatively soft for passenger comfort and to avoid damage to the aircraft. Accordingly, typical landing procedures for a fixed wing aircraft include large lateral energy. The large lateral energy is maintained in case a landing needs to be aborted due, for example, to congestion on a runway. However, when the UAV 100 is being directed to an off-site landing site, the UAV 100 either does not have to capabilities to perform a traditional landing or may not be able to make it to a proper landing site. As such, the priority of the off-site landing system 120 is not to land softly, but rather to reduce the risk to people and property on the ground. Accordingly, the maneuver to minimize the lateral energy of the UAV 100 is not necessarily designed to reduce damage to the payload of the UAV 100 or to the UAV 100 itself, but rather to minimize the impact area of the UAV 100 upon touchdown at the off-site landing site by reducing the area that the UAV 100 can impact with the off-site landing touchdown. However, the trajectory generation system 180 may first evaluate whether a trajectory can be generated which can minimize the vertical touchdown speed while having the UAV 100 come to a complete stop within the off-site landing site before settling for the maneuver to minimize the lateral energy of the UAV 100.

Figure 3:
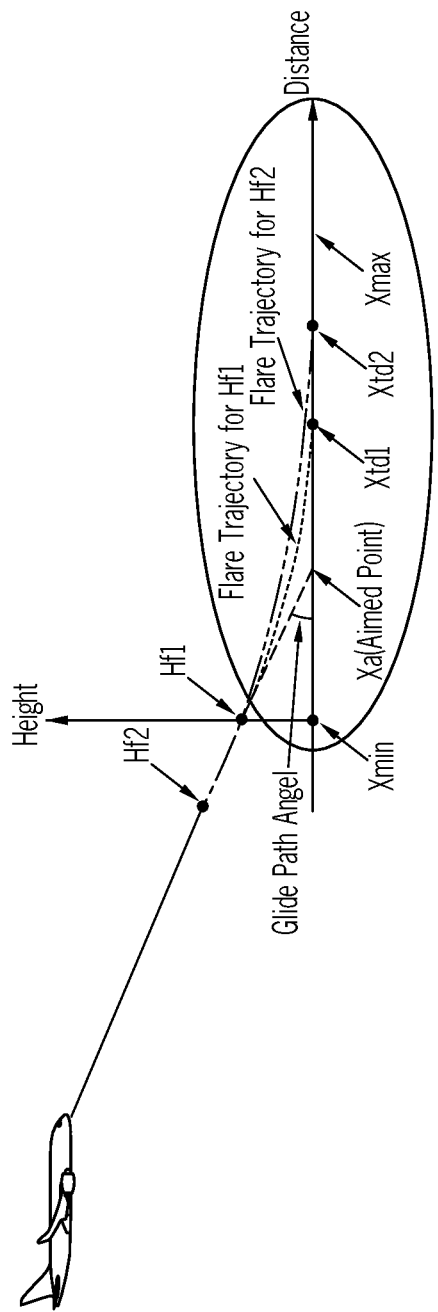
FIG. 3 illustrates an exemplary trajectory for landing at an off-site landing site when the unmanned aerial vehicle is capable of landing at the off-site landing site while staying within the bounds of the site, in accordance with an embodiment.

FIG. 3 illustrates an exemplary trajectory for landing at an off-site landing site when the UAV 100 is capable of landing at the off-site landing site while staying within the bounds of the site. As seen in FIG. 3, the trajectory includes a flare maneuver designed to reduce damage to the UAV 100 while still allowing the UAV 100 to come to a complete stop within the site. For a normal auto landing at a landing site (i.e., a runway), the length that can be used for landing is fixed, the approach flight path angle and the final approach speed is fixed, typically the flare trajectory is a fixed exponential curve (e.g., start at 50 feet above runway threshold) that will reduce the vertical speed to a target touch down vertical speed. As discussed in further detail below, when landing at an off-site landing site, the flight path angle, the final approach speed are variable, thus the flare trajectory is variable to ensure the UAV could stop inside the off-site landing site with minimum vertical speed.

Figure 4:
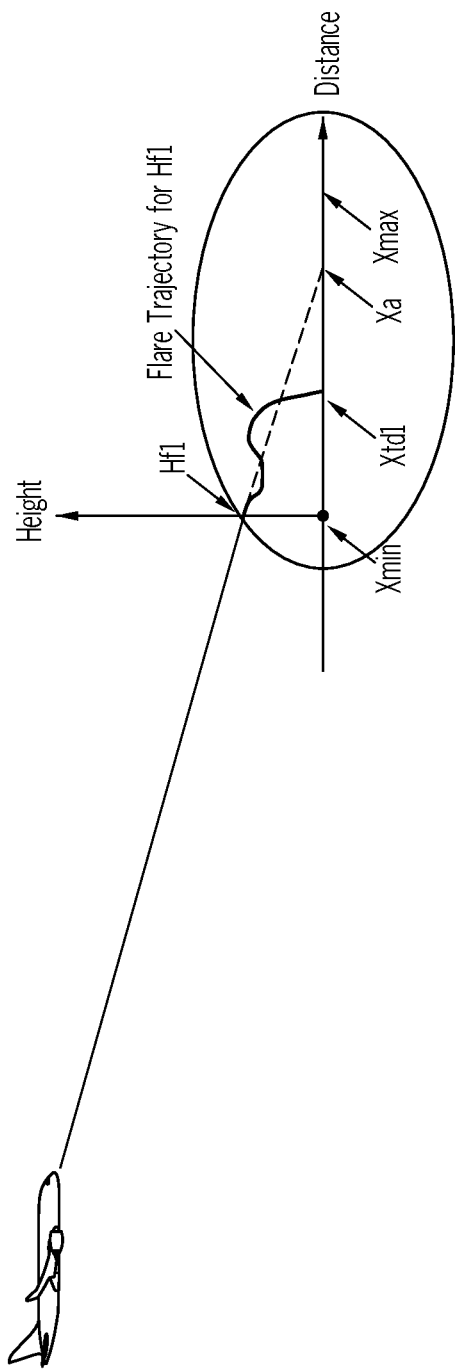
FIG. 4 illustrates an exemplary trajectory for minimizing the lateral energy of the unmanned aerial vehicle, in accordance with an embodiment.

As discussed above, a landing such as depicted in FIG. 3 may not always be possible depending upon the size of the off-site landing site, the terrain of the offsite landing site and the capabilities of the UAV 100. FIG. 4 illustrates an exemplary trajectory for minimizing the lateral energy of the UAV 100. As seen in FIG. 4, the trajectory includes a flare maneuver designed to cause a stall to the UAV 100 so that the UAV 100 is guaranteed to stop within the confines of the off-site landing site while having minimal lateral energy. In one embodiment, for example, the processor 130 may generate instructions to dump fuel from the fuel system 112 prior to performance of the stall maneuver to reduce the chance of fire upon touch down.

The trajectory generation system 180 may first attempt to build an ideal trajectory according to FIG. 3 which lands the UAV 100 within the off-site landing site with an acceptable sink rate while achieving a full stop within the off-site landing site. The trajectory determined by the trajectory generation system includes, for example, flare height $H_f$ and a trajectory time constant $\tau$.

The height of the ideal flare trajectory is given by:

$$h(t) = H_f \times e^{-t/\tau} \quad \text{(Equation 1)}$$

Where h(t) is a height above the ground at the off-site landing site as a function of time t, t begins at a point where the flare trajectory illustrated in FIG. 3 begins and ends when the UAV 100 is projected to touch the ground, $H_f$ is the height where the flare maneuver begins, and $\tau$ is a time constant which is discussed in further detail below.

The vertical speed $V_Z$ of the ideal trajectory is derivative of the height h(t) according to:

$$V_Z = \dot{h}(t) = -\frac{H_f}{\tau} \times e^{-t/\tau} \quad \text{(Equation 2)}$$

From equation (1) and (2), the equation to calculate the vertical speed $V_Z$ can be derived to:

$$V_Z = -\frac{h(t)}{\tau} \quad \text{(Equation 3)}$$

A target touch down vertical speed $V_{ztp}$ of the ideal trajectory can be determined by:

$$V_{ztp} = -\frac{htp}{\tau} \quad \text{(Equation 4)}$$

where htp is a constant for the touchdown height, which could be set as a value between $0 < htp < H_f$. In one embodiment, for example, when htp is set it to 1 meter, the actual flare height could be $H_f - 1$, to ensure a touch down will be met.

Assuming when the UAV 100 starts to flare, the airspeed is $V_0$, the flight path angle $\gamma_0$ of the ideal trajectory is $$\gamma_0 \left(-\frac{\pi}{2} < \gamma_0 < 0\right),$$

then a vertical speed at the start of the flare is $V_{z0} = V_0 \times \sin(\gamma_0)$. From equation (3), the time constant $\tau$ can be derived as:

$$\tau = -\frac{H_f}{V_0 \times \sin(\gamma_0)} \quad \text{(Equation 5)}$$

Accordingly, the trajectory generation system 180 can decrease the vertical speed $H_{ztp}$ of the ideal trajectory by increasing $H_f$, decreasing $V_0$ or decreasing $\gamma_0$ per equation (4) and (5). However, these parameters cannot be adjusted randomly because the touch down distance $X_{td}$ is influenced by them according to:

$$X_{td} = \int_0^{td} V_x dt = \int_0^{-\tau \cdot \ln\frac{htp}{H_f}} V_x dt = \int_0^{\frac{H_f}{V_0 \times \sin(\gamma_0)} \cdot \ln\frac{htp}{H_f}} V_x dt \quad \text{(Equation 6)}$$

As the UAV 100 is expected to touchdown in the off-site landing site, $X_{td}$ is limited by: $X_{min} \leq X_{td} \leq X_{max}$. $X_{min}$ is the predefined point that the UAV 100 must touch down after it to ensure the UAV 100 will not land outside the crash area. $X_{min}$ may be determined according to $$X_{min} = -\frac{H_f}{\tan(\gamma_0)} - L_1.$$

$X_{max}$ is a calculated point that UAV 100 must touch down before to ensure UAV 100 can achieve a full stop within the crash area. $X_{max}$ may be determined according to $$X_{max} = -\frac{H_f}{\tan(\gamma_0)} + L_2.$$

In these equations, $L_1$ is the fixed distance between $X_a$ and $X_{min}$, Xa being the aimed point (i.e., the point the UAV 100 is directed towards before the flare maneuver begins) and $L_2$ is a ($V_{x0}$, L)-dependent distance between $X_a$ and $X_{max}$, L is length of the crash station.). A total braking distance (TBD) for the site may be determined by $TBD = L - L_1 - L_2$.

Accordingly the trajectory generation system 180 attempts to find values for $H_f$ which satisfy the equations:

$$-L_1 \leq \int_0^{\frac{H_f}{V_0 \times \sin(\gamma_0)} \cdot \ln\frac{htp}{H_f}} V_x dt + \frac{H_f}{\tan(\gamma_0)} \leq L_2, \quad \text{(Equations 7)}$$

$$-\frac{\pi}{2} < \gamma_0 < 0, \, 0 < htp < H_f,$$

If $L_2 < -L_1$, there will be no combination of values for $H_f$, $V_0$, and $\gamma_0$ which satisfy all three of the equations of Equation 7. When $L_2 < -L_1$, the required braking distance is too long to achieve a full stop inside the crash area. Accordingly, in these instances, the trajectory generation system 180 generates a new trajectory which minimizes the lateral energy as illustrated in FIG. 4, and as discussed in further detail below. $L_2 = h(V_0, \gamma_0, L)$ is a monotone decreasing function for $V_0$, which is corresponding to the scenario where the larger the initial $V_0$ is, the longer the braking distance which is required.

In order to determine an $H_f$ which satisfies equation 7, the trajectory generation system may determine a function of $H_f$, $f(H_f)$ according to:

$$f(H_f) = \int_0^{\frac{H_f}{V_0 \times \sin(\gamma_0)} \cdot \ln\frac{htp}{H_f}} V_x dt + \frac{H_f}{\tan(\gamma_0)} \quad \text{(Equation 8)}$$

Figure 5:
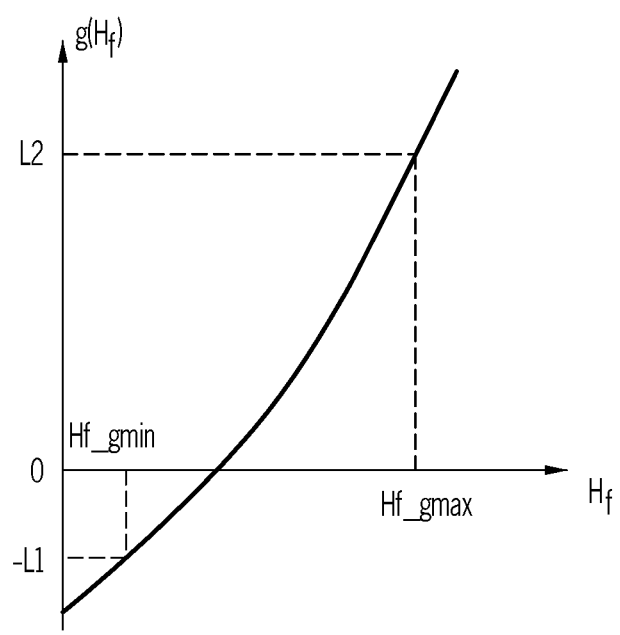
FIG. 5 illustrates an exemplary value curve of an expression $g(H_f)$ with respect to flare height $H_f$ and the way to obtain minimum and maximum flare heights based on given value $L_1$ and $L_2$.

Depending upon the capabilities of the UAV 100, the trajectory generation system 180 determines $H_f$ in different ways. In a scenario where the lateral speed $V_x$ is one of controlled variables during the flare and it is controlled to $V_x(t) = V_{x0} = V_0 \times \cos(\gamma_0)$, then:

$$-L_1 \leq f(H_f)|_{V_x(t)=V_{x0}} = \quad \text{(Equation 9)}$$

$$g(H_f) = \frac{H_f}{\tan(\gamma_0)}\left(\ln\frac{htp}{H_f} + 1\right) \leq L_2 \text{ where}$$

$$-\frac{\pi}{2} < \gamma_0 < 0$$

and $0<htp<H_f$ and $g(H_f)$ is a normal landing trajectory. Because $$\dot{g}(H_f) = \frac{1}{\tan(\gamma_0)}\left(\ln^{htp} - \ln^{H_f}\right) \text{ and } \dot{g}(H_f)$$

greater than zero, $g(H_f)$ is a monotonic increasing function which can be plotted as indicated in FIG. 5. FIG. 5 illustrates an exemplary value curve of the expression $g(H_f)$ with respect to $H_f$ and the way to obtain minimum and maximum flare heights based on $L_1$ and $L_2$. In one embodiment, for example, the trajectory generation system 180 may determine a minimum flare height $H_{f\_gmin}$ and maximum flare height $H_{f\_gmax}$ using a graphing method. In other words, the trajectory generation system 180 plots $g(H_f)$ to determine $H_{f\_gmin}$ and $H_{f\_gmax}$.

The trajectory generation system 180 is expected to generate a trajectory that lands the UAV 100 inside the off-site landing site as close to Xmin (i.e., the point at which the UAV 100 must touch down after it to ensure the UAV 100 will not land outside the landing site) as possible with acceptable sink rate that is not greater than $V_{ztp\_max}$. In other words, as seen in the various scenarios below, the trajectory generation system 180 first attempts to touch down the UAV 100 with a sink rate that is not greater than $H_{ztp\_max}$ in order to minimize damage to the UAV 100. However, when a trajectory is not available, the trajectory generation system 180 generates a trajectory as illustrated in FIG. 4 in order to minimize the lateral energy of the UAV 100.

In a scenario where the failure of the components 110 of the UAV results in an inability to control the airspeed $V_0$ while maintaining the required flight path angle, the trajectory generation system 180 may determine the flare height $H_f$ according to:

Step 1: Obtain $H_{f\_gmin}$ through $$g(H_f) = \frac{H_f}{\tan(\gamma_0)}\left(\ln\frac{htp}{H_f} + 1\right) = L_1.$$

If $H_c<H_{f_{gmin}}$, where $H_c$ is the current altitude of aircraft, go to Step 6, else, go to Step 2.

Step 2: Compute $L_2 = h(V_0, \gamma_0, L)$. If $L_2<-L_1$, go to Step 6, else, follow Step 3~5.

Step 3: Obtain $H_{f\_gmax}$ through $$g(H_f) = \frac{H_f}{\tan(\gamma_0)}\left(\ln\frac{htp}{H_f} + 1\right) = L_2$$

Step 4: Compute $H_{f\_smin}$ to meet the sink rate limitation through $$H_{f\_smin} = \frac{V_0 \times \sin(\gamma_0)}{V_{ztp\_max}}$$

Step 5: If $H_c<H_{f\_smin}$, go to Step 6,
Else, continue that:
If $H_{f\_smin} \in [H_{f\_gmin}, H_{f\_gmax}]$, then $H_f = H_{f\_smin}$-htp. In this case, the UAV 100 touches down inside area with sink rate $$V_{ztp} = \frac{V_0 \times \sin(\gamma_0)}{H_{f\_smin}} = V_{ztp\_max}$$

and achieves a full stop within the off-site landing site.
End Steps.
Else if $H_{f\_smin}<H_{f\_gmin}$, then $H_f=H_{f\_gmin}$-htp. In this case, the UAV 100 touches down on xmin with sink rate $$V_{ztp} = \frac{V_0 \times \sin(\gamma_0)}{H_{f\_gmin}} < V_{ztp\_max}$$

and achieves a full stop within the off-site landing site.
End Steps.
Else if $H_{f\_smin}>H_{f\_gmax}$, go to Step 6.
Step 6: The trajectory generation system 180 generates instructions causing the UAV 100 to flare at Hf1 to stall, as illustrated in FIG. 4. In this case, UAV is full stopped within the off-site landing site.
End Steps.

In a scenario that the UAV 100 is capable to control itself to meet the speed constraint $V_0$ and the flight path angle $\gamma_0$ before the flare is initiated, $V_0$ and $H_f$ is decided by:

Step 1: Obtain $H_{f\_gmin}$ through $$g(H_f) = \frac{H_f}{\tan(\gamma_0)}\left(\ln\frac{htp}{H_f} + 1\right) = L_1.$$

If $H_c<H_{f_{gmin}}$, go to Step 4, else, follow Step 2~3.
Step 2: Compute $$V_{0\_max\_sink\_rate} = \frac{H_{f\_gmin}V_{ztp\_max}}{\sin(\gamma_0)};$$

Compute $V_{0\_max\_L2}=h^{-1}(-L_1, L, \gamma_0)$;
Obtain $V_{0\_max}=\min(V_{0\_max\_sink\_rate}, V_{0\_max\_L2})$ and $V_{0\_min}32\ V_{stall}$.

Step 3: Select $\forall V_0 \in [V_{0\_min}, V_{0\_max}]$, then $H_f=H_{f\_gmin}$-htp. In this case, the UAV 100 touches down on Xmin with sink rate $$V_{ztp} = \frac{V_0 \times \sin(\gamma_0)}{H_{f\_gmin}} \leq V_{ztp\_max}$$

and achieves a full stop within the off-site landing site.
End Steps.
Step 4: The trajectory generation system 180 generates instructions causing the UAV 100 to flare at Hf1 to stall, as illustrated in FIG. 4. In this case, UAV is full stopped within the off-site landing site.
End Steps.

Assuming $V_x$ is not a controlled variable during the flare maneuver due to the capabilities of the UAV 100, and $0<V_x(t)<V_{x0}=V_0\times\cos(\gamma_0)$. Accordingly, in this scenario, the trajectory generation system 180 modifies Equation 8 above as follows:

$$\frac{H_f}{\tan(\gamma_0)} = l(H_f) < f(H_f) < g(H_f) =$$ (Equation 10)

$$\frac{H_f}{\tan(\gamma_0)}\left(\ln\frac{htp}{H_f}+1\right) - \frac{\pi}{2} < \gamma_0 < 0, 0 < htp < H_f$$

Accordingly, in this scenario when $$\frac{H_f}{\tan(\gamma_0)} \geq -L_1 \text{ and } g(H_f) \leq L_2,$$

then $-L_1 \leq f(H_f) \leq L_2$ is satisfied. Because $$l(H_f) = \frac{1}{\tan(\gamma_0)} < 0, l(H_f)$$

is a monotonic decreasing function. Therefore, the trajectory generation system 180 can obtain $$H_{f\_lmax} = -\frac{L_1}{\tan(\gamma_0)}.$$

Accordingly, the trajectory generation system 180 can generate a trajectory which stops the UAV 100 within the off-site landing site when $H_f \leq \min[H_{f\_lmax}, H_{f\_gmax}] - htp$. Although $V_x$ is unknown, the monotonic increasing property of $f(H_f)$ is assumable, which allows the trajectory generation system 180 to generate a trajectory which causes the UAV 100 to land closer to Xmin with lower flare height.

In a scenario where the airspeed $V_0$ is not controllable while maintaining the required flight path angle, the flare height $H_f$ is decided by:

Step 1: Compute $L_2 = h(V_0, \gamma_0, L)$. If $L_2 < -L_1$, go to Step 5, else, follow Step 2~4.

Step 2: Obtain $H_{f\_gmax}$ through $$g(H_f) = \frac{H_f}{\tan(\gamma_0)}\left(\ln\frac{htp}{H_f}+1\right) = L_2;$$

Step 3: Compute $H_{f\_smin}$ to meet the sink rate limitation through $$H_{f\_smin} = \frac{V_0 \times \sin(\gamma_0)}{V_{ztp\_max}}$$

Step 4: If $H_c < H_{f\_smin}$, go to Step 5,
Else, continue that:
  If $H_{f\_smin} \leq \min[H_{f\_lmax}, H_{f\_gmax}]$, then $H_f = H_{f\_smin} - htp$. In this case, the UAV is touches down with a sink rate $$V_{ztp} = \frac{V_0 \times \sin(\gamma_0)}{H_{f\_smin}} = V_{ztp\_max}$$

and achieves a full stop within the off-site landing site.
End Steps.
Else if $H_{f\_smin} > \min[H_{f\_lmax}, H_{f\_gmax}]$, go to Step 5.

Step 5: The trajectory generation system 180 generates instructions causing the UAV 100 to flare at Hf1 to stall, as illustrated in FIG. 4. In this case, UAV is full stopped within the off-site landing site. End Steps.

In a scenario that the UAV 100 is capable to control itself to meet the speed constraint $V_0$ and the flight path angle $\gamma_0$ before the flare is initiated, when selecting a $V_0$, the trajectory generation system 180 considers the relation among $V_0$, $L_2$, $H_{f\_gmax}$, and $V_{0\_max\_sink\_rate}$:

$$V_{0\_max\_sink\_rate} = \frac{H_{f\_gmax} * V_{ztp\_max}}{\sin(\gamma_0)}$$

$$= \frac{g'(L_2) * V_{ztp\_max}}{\sin(\gamma_0)}$$

$$= \frac{g'(h(V_0, \gamma_0, L)) * V_{ztp\_max}}{\sin(\gamma_0)}$$

Once $V_0$ is selected, its corresponding boundary $V_{0\_max\_sink\_rate}$ is also determined by the trajectory generation system 180. To meet the sink rate requirement, the following should be met:

$$V_{0\_max\_sink\_rate} - V_0 \geq 0$$

Let: $m(V_0) = V_{0\_max\_sink\_rate} - V_0$
We have:

$$\dot{m}(V_0) = \frac{V_{ztp\_max}}{\sin(\gamma_0)} \dot{g}'(h(V_0))\dot{h}(V_0) - 1$$

Since $\dot{h}(V_0) < 0$ from [0058]/[0056] and,
$\dot{g}'(h(V_0)) > 0$ from [0060].
Thus, $\dot{m}(V_0) < 0$ Therefore, the trajectory generation system 180 can obtain $V_{0\_max\_L2}$ when $m(V_0) = 0$. With the analysis above, the trajectory generation system 180 can determine $V_0$ and $H_f$ in this scenario by:

Step 1: Obtain $V_{0\_max\_L2}$ through $$m(V_0) = \frac{g'(h(V_0, \gamma_0, L)) * V_{ztp\_max}}{\sin(\gamma_0)} - V_0 = 0;$$

Compute $$V_{0\_lmax\_sink\_rate} = \frac{\min(H_{f\_lmax}, H_c) * V_{ztp\_max}}{\sin(\gamma_0)};$$

Obtain $V_{0\_max} = \min(V_{0\_lmax\_sink\_rate}, V_{0\_max\_L2})$ and $V_{0\_min} = V_{stall}$.

Step 2: Select $\forall V_0 \in [V_{0\_min}, V_{0\_max}]$, then $$H_f = \frac{V_0 \times \sin(\gamma_0)}{V_{ztp\_max}} - htp.$$

In this case, the UAV 100 touches down inside the off-site landing site with a sink rate $V_{ztp} = V_{ztp\_max}$ and achieves a full stop within the off-site landing site.
End Steps.

The above trajectory calculations are merely exemplary and represent possible trajectory calculations based upon assuming certain failures in the UAV 100. Different failures resulting in different capabilities may require different trajectories in order to land or stall at an off-site landing site, as illustrated in FIGS. 3 and 4, respectively.

Returning to FIG. 2, if the trajectory generation system 180 is unable to create a trajectory for one of the two landing maneuvers, the processor 130 returns to Step 228 to determine if another off-site landing site is available. (Step 234). When the trajectory generation system 180 is able to generate a trajectory, the processor 130 instructs the UAV 100 via control signals to proceed along the trajectory and reports the trajectory using the communication system. (Step 236). As discussed above, the report may include a data report and/or a voice-based report in order to inform other pilots of aircraft in the area about the trajectory of the UAV 100. The processor 130 then proceeds to step 224 to determine if the UAV 100 has recovered from the failure.

Accordingly, the off-site landing system 120 of the UAV 100 is able to effectively land the UAV 100 at landing sites or even at off-site landing sites during certain failures while also generating trajectories which minimize collateral damage to ground elements when the failures of the UAV 100 reduce the ability of the UAV to perform the landing.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fixed wing unmanned aerial vehicle having a plurality of components, comprising:
   a failure detection system configured to detect faults in one or more of the plurality of components, wherein the failure detection system continuously monitors the fixed wing unmanned aerial vehicle for new faults and when faults are resolved;
   a communication system, the communication system comprising at least one data communication system and at least one voice communication system; and
   a processor communicatively coupled to the communication system and the failure detection system, the processor configured to:
      determine, when one or more faults are detected by the failure detection system, a capability level of the fixed wing unmanned aerial vehicle based upon the one or more detected faults, wherein the processor is further configured to continuously update the capability level based upon any new faults received from the failure detection system and any resolved faults received from the failure detection system;
      determine, when the capability level of the unmanned aerial vehicle is below a predetermined threshold, that an off-site landing is necessary, wherein the processor is further configured to continuously update determination that an off-site landing is necessary based upon updates to the determined capability level and cancel a determination that an off-site landing is necessary when the capability level rises above the predetermined threshold;
      generate, when an off-site landing is necessary, a voice warning using the at least one voice communication system, the voice warning comprising at least one of a pre-recorded message and a voice synthesized message;
      determine, when an off-site landing is necessary, a maximum range of the fixed wing unmanned aerial vehicle based upon the capability level of the unmanned aerial vehicle;
      determine, based upon the capability level and the maximum range of the fixed wing unmanned aerial vehicle, whether a predetermined off-site landing site is within the maximum range of the unmanned aerial vehicle, the predetermined off-site landing site comprising a designated area for off-site landings; and
      determine a path to the predetermined off-site landing based upon the determined capability level of the fixed wing unmanned aerial vehicle, a type of landing site associated with the predetermined off-site landing site and the type of faults detected, wherein the path is determined according to:
         determining, by the processor, when a trajectory can be built based upon the capabilities of the fixed wing unmanned aerial vehicle that will allow the fixed wing unmanned aerial vehicle to come to a full stop inside of a defined area within the predetermined off-site landing site, where the path is set to include the trajectory; and
         determining, when the trajectory cannot be built to allow the fixed wing unmanned aerial vehicle to come to a full stop inside of a defined area within the predetermined off-site landing site, a trajectory which minimizes a lateral energy of the fixed wing unmanned aerial vehicle within the predetermined off-site landing site, the trajectory including a pitch as the fixed wing unmanned aerial vehicle approaches the ground which induces a stall of the fixed wing unmanned aerial vehicle; and
      generate commands for a control system to direct the unmanned aerial vehicle to the predetermined off-site landing site using the determined path when the predetermined off-site landing site is within the determined maximum range of the unmanned aerial vehicle; and
      generate commands for the control system to direct the unmanned aerial vehicle away from populated areas when the predetermined off-site landing site is outside the determined maximum range of the unmanned aerial vehicle.

2. The unmanned aerial vehicle according to claim 1, wherein the processor is further configured to generate, when the unmanned aerial vehicle is approaching the predetermined off-site landing site, a command to dump fuel when the processor determines that the fixed wing unmanned aerial vehicle cannot come to a full stop inside of a defined area within the predetermined off-site landing site.

3. The unmanned aerial vehicle according to claim 1, wherein the failure detection system continuously monitors the fixed wing unmanned aerial vehicle for new faults and when faults are resolved.

4. The unmanned aerial vehicle according to claim 3, wherein the processor is further configured to continuously update the capability level based upon any new faults received from the failure detection system and any resolved faults received from the failure detection system.

5. The unmanned aerial vehicle according to claim 1, wherein the processor is further configured to continuously update determination that an off-site landing is necessary based upon updates to the determined capability level.

6. The unmanned aerial vehicle according to claim 5, wherein the processor is further configured to cancel a determination that an off-site landing is necessary when the capability level rises above the predetermined threshold.

7. The unmanned aerial vehicle according to claim 1, wherein the processor is further configured to generate, when an off-site landing is necessary, a voice warning using the at least one voice communication system.

8. The unmanned aerial vehicle according to claim 7, wherein the voice warning comprises at least one of a pre-recorded message and a voice synthesized message.

9. The unmanned aerial vehicle according to claim 1, wherein the processor is further configured to generate commands for the control system to direct the unmanned aerial vehicle away from populated areas when the predetermined off-site landing site is outside the determined maximum range of the unmanned aerial vehicle.

10. A method of operating a fixed wing unmanned aerial vehicle having a plurality of components, the method comprising:
    detecting, by a failure detection system, one or more faults in the plurality of components;
    determining, by a processor, when one or more faults are detected by the failure detection system, a capability level of the fixed wing unmanned aerial vehicle based upon the one or more detected faults;
    determining, by the processor, when the capability level of the unmanned aerial vehicle is below a predetermined threshold, that an off-site landing is necessary;
    determining, by the processor, when an off-site landing is necessary, a maximum range of the fixed wing unmanned aerial vehicle based upon the capability level of the unmanned aerial vehicle;
    determining, by the processor, based upon the capability level and the maximum range of the fixed wing unmanned aerial vehicle, whether a predetermined off-site landing site is within the maximum range of the unmanned aerial vehicle, the predetermined off-site landing site comprising a designated area for off-site landings; and
    determining, by the processor, a path to the predetermined off-site landing based upon the determine capability level of the fixed wing unmanned aerial vehicle, a type of landing site associated with the predetermined off-site landing site and the type of faults detected,
    generating, by the processor, commands for a control system to direct the unmanned aerial vehicle to the predetermined off-site landing site using the determined path when the predetermined off-site landing site is within the determined maximum range of the unmanned aerial vehicle,
    wherein the path is determined according to:
        determining, by the processor, when a trajectory can be built based upon the capabilities of the fixed wing unmanned aerial vehicle that will allow the fixed wing unmanned aerial vehicle to come to a full stop inside of a defined area within the predetermined off-site landing site, where the path is set to include the trajectory; and
        determining, when the trajectory cannot be built to allow the fixed wing unmanned aerial vehicle to come to a full stop inside of a defined area within the predetermined off-site landing site, a trajectory which minimizes a lateral energy of the fixed wing unmanned aerial vehicle within the predetermined off-site landing site, the trajectory including a pitch as the fixed wing unmanned aerial vehicle approaches the ground which induces a stall of the fixed wing unmanned aerial vehicle.

11. The method of claim 10, further comprising:
generating, by the processor, when the unmanned aerial vehicle is approaching the predetermined off-site landing site, a command to dump fuel when the fixed wing unmanned aerial vehicle cannot come to a full stop inside of a defined area within the predetermined off-site landing site.

12. The method of claim 10, further comprising:
continuously monitoring, in the failure detection system, the fixed wing unmanned aerial vehicle for new faults and when faults are resolved.

13. The method of claim 12, further comprising:
continuously updating, by the processor, the capability level based upon any new faults received from the failure detection system and any resolved faults received from the failure detection system.

14. The method of claim 10, further comprising:
continuously updating, by the processor, determination that an off-site landing is necessary based upon updates to the determined capability level.

15. The method of claim 14, further comprising:
canceling, by the processor, a determination that an off-site landing is necessary when the capability level rises above the predetermined threshold.

16. The method of claim 10, further comprising:
generating, by the processor, a voice warning using at least one voice communication system when an off-site landing is necessary.

17. The method of claim 16, wherein the voice warning comprises at least one of a pre-recorded message and a voice synthesized message.

18. The method of claim 10, further comprising:
generating, by the processor, commands for the control system to direct the unmanned aerial vehicle away from populated areas when the predetermined off-site landing site is outside the determined maximum range of the unmanned aerial vehicle.

19. The unmanned aerial vehicle according to claim 1, wherein the processor is further configured to generate, when the unmanned aerial vehicle is approaching the predetermined off-site landing site, a command to dump fuel when the processor determines that the fixed wing unmanned aerial vehicle cannot come to a full stop inside of a defined area within the predetermined off-site landing site.

20. A fixed wing unmanned aerial vehicle having a plurality of components, comprising:
    a failure detection system configured to detect faults in one or more of the plurality of components;
    a communication system, the communication system comprising at least one data communication system and at least one voice communication system; and
    a processor communicatively coupled to the communication system and the failure detection system, the processor configured to:
        determine, when one or more faults are detected by the failure detection system, a capability level of the fixed wing unmanned aerial vehicle based upon the one or more detected faults;
        determine, when the capability level of the unmanned aerial vehicle is below a predetermined threshold, that an off-site landing is necessary;

determine, when an off-site landing is necessary, a maximum range of the fixed wing unmanned aerial vehicle based upon the capability level of the unmanned aerial vehicle;

determine, based upon the capability level and the maximum range of the fixed wing unmanned aerial vehicle, whether a predetermined off-site landing site is within the maximum range of the unmanned aerial vehicle, the predetermined off-site landing site comprising a designated area for off-site landings; and determine a path to the predetermined off-site landing based upon the determine capability level of the fixed wing unmanned aerial vehicle, a type of landing site associated with the predetermined off-site landing site and the type of faults detected, wherein the path is determined according to:

determining, by the processor, when a trajectory can be built based upon the capabilities of the fixed wing unmanned aerial vehicle that will allow the fixed wing unmanned aerial vehicle to come to a full stop inside of a defined area within the predetermined off-site landing site, where the path is set to include the trajectory; and determining, when the trajectory cannot be built to allow the fixed wing unmanned aerial vehicle to come to a full stop inside of a defined area within the predetermined off-site landing site, a trajectory which minimizes a lateral energy of the fixed wing unmanned aerial vehicle within the predetermined off-site landing site, the trajectory including a pitch as the fixed wing unmanned aerial vehicle approaches the ground which induces a stall of the fixed wing unmanned aerial vehicle; and generate commands for a control system to direct the unmanned aerial vehicle to the predetermined off-site landing site using the determined path when the predetermined off-site landing site is within the determined maximum range of the unmanned aerial vehicle.

* * * * *